United States Patent [19]

Scaramucci

[11] Patent Number: 4,852,603
[45] Date of Patent: Aug. 1, 1989

[54] SWING CHECK VALVE WITH SECURED CARTRIDGE

[76] Inventor: John P. Scaramucci, 10724 Woodridden, Oklahoma City, Okla. 73170

[21] Appl. No.: 286,706
[22] Filed: Dec. 20, 1988
[51] Int. Cl.[4] .............................................. F16K 15/03
[52] U.S. Cl. ................................... 137/316; 137/327; 137/515.7; 137/527.8
[58] Field of Search ..................... 137/316, 327, 515.5, 137/515.7, 527–527.8

[56] References Cited

U.S. PATENT DOCUMENTS

| | | | |
|---|---|---|---|
| 3,933,173 | 1/1976 | Kajita | 137/527.8 |
| 3,937,441 | 2/1976 | Baumann | 137/527 X |
| 4,201,241 | 5/1980 | Schertler | 137/527 |
| 4,586,534 | 5/1986 | McNeely | 137/515.7 |

OTHER PUBLICATIONS

Publication: Gray Tool Company, Graychek, May 1971.

Primary Examiner—Robert G. Nilson
Attorney, Agent, or Firm—Dunlap, Codding, Peterson & Lee

[57] ABSTRACT

A swing check valve for use between flanges wherein the valve seat and cage for the valve disc extend from the upstream to the downstream ends of the valve body. Cooperating shoulders are provided in the valve body and the member forming the seat and cage to prevent upstream movement of these members in the valve body, and downstream movement is prevented by plate-like members fitting in recesses in the cage portion and the valve body bore.

19 Claims, 5 Drawing Sheets

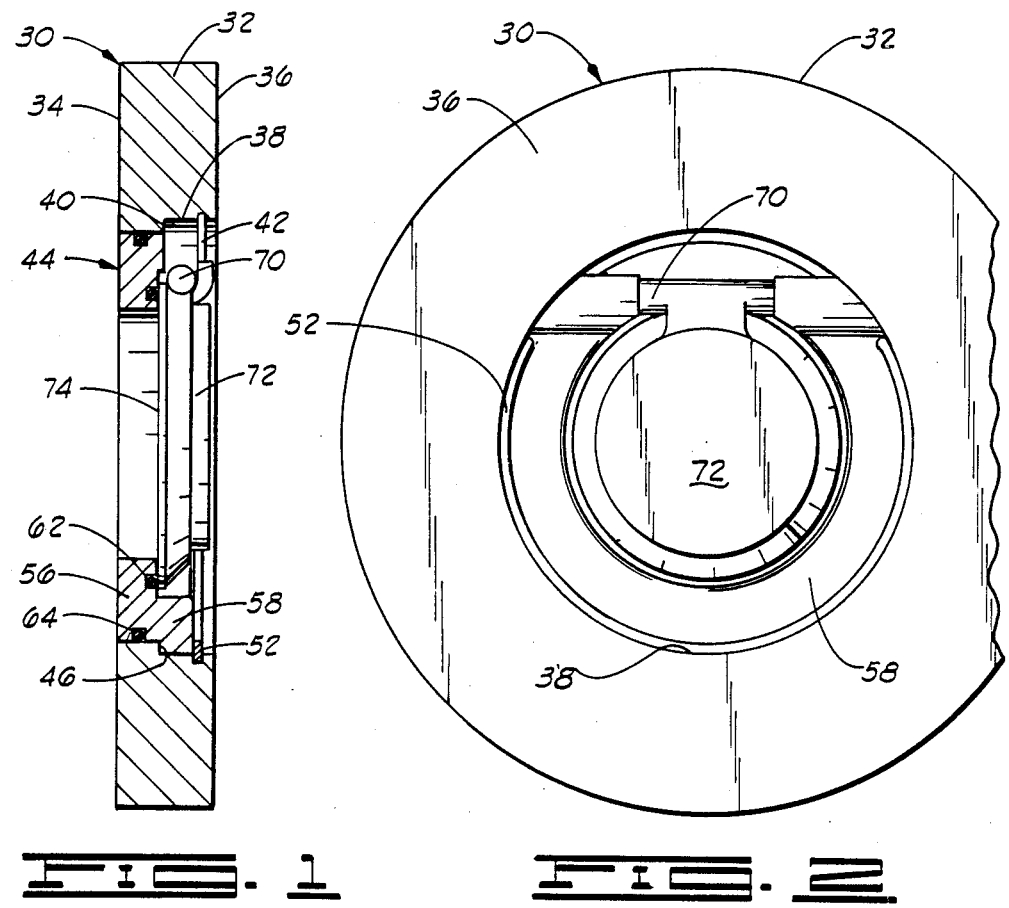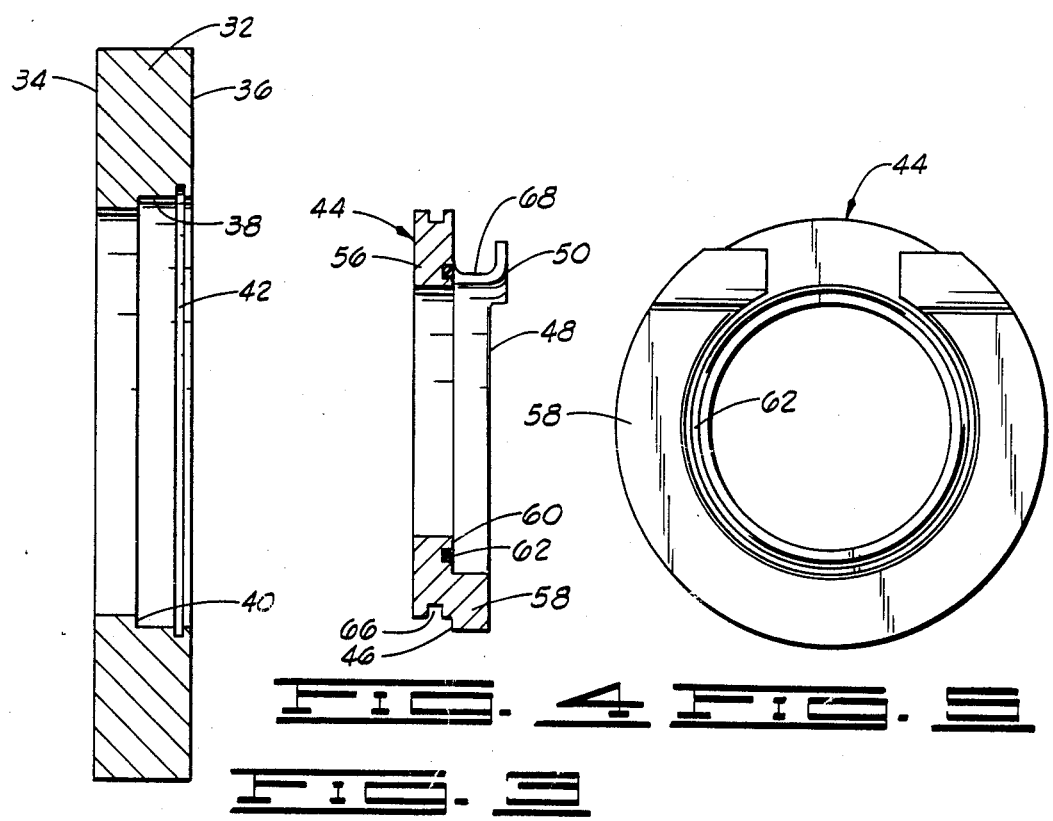

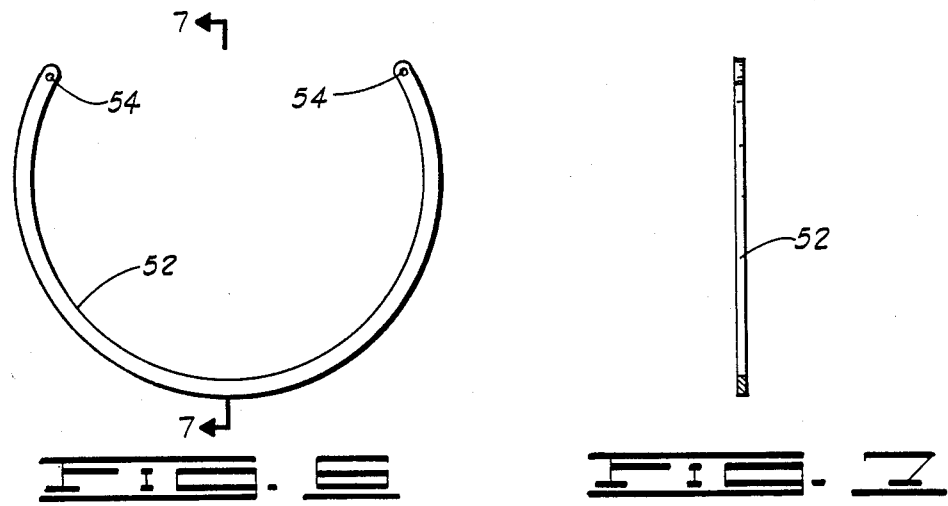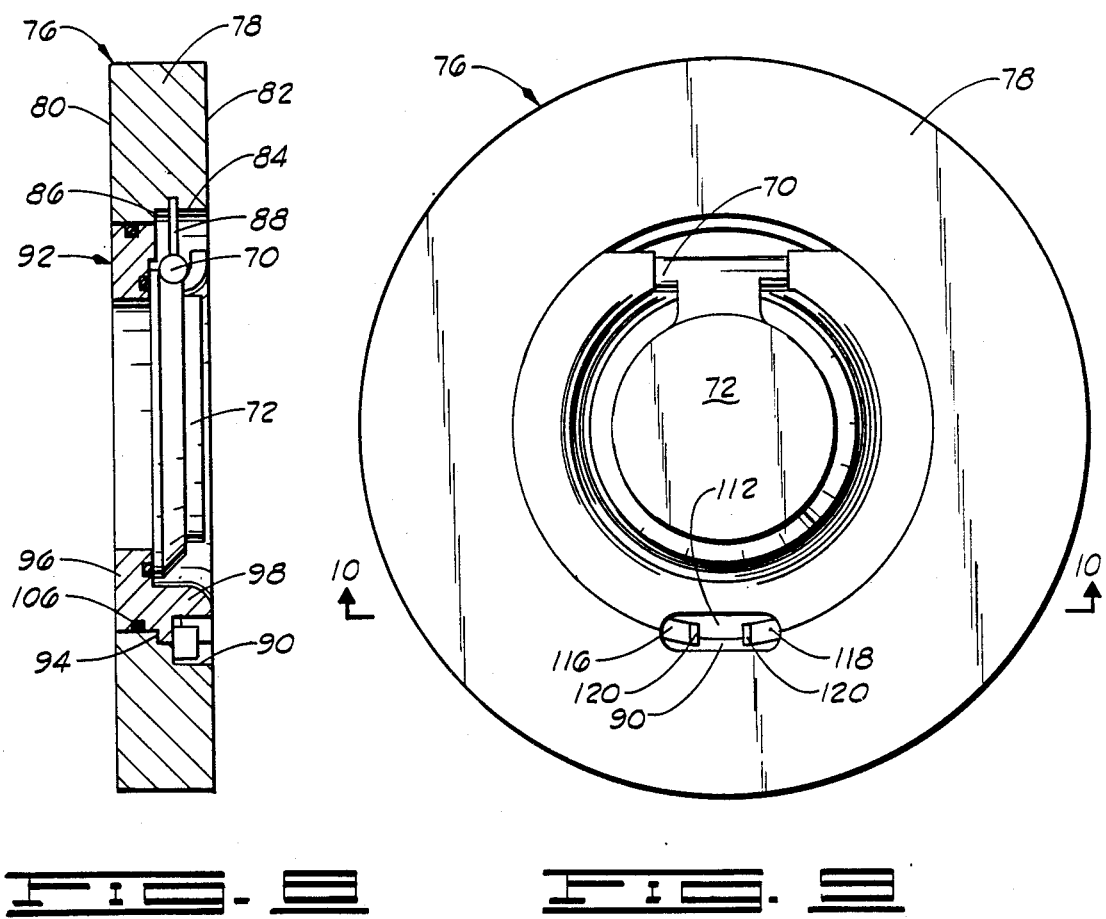

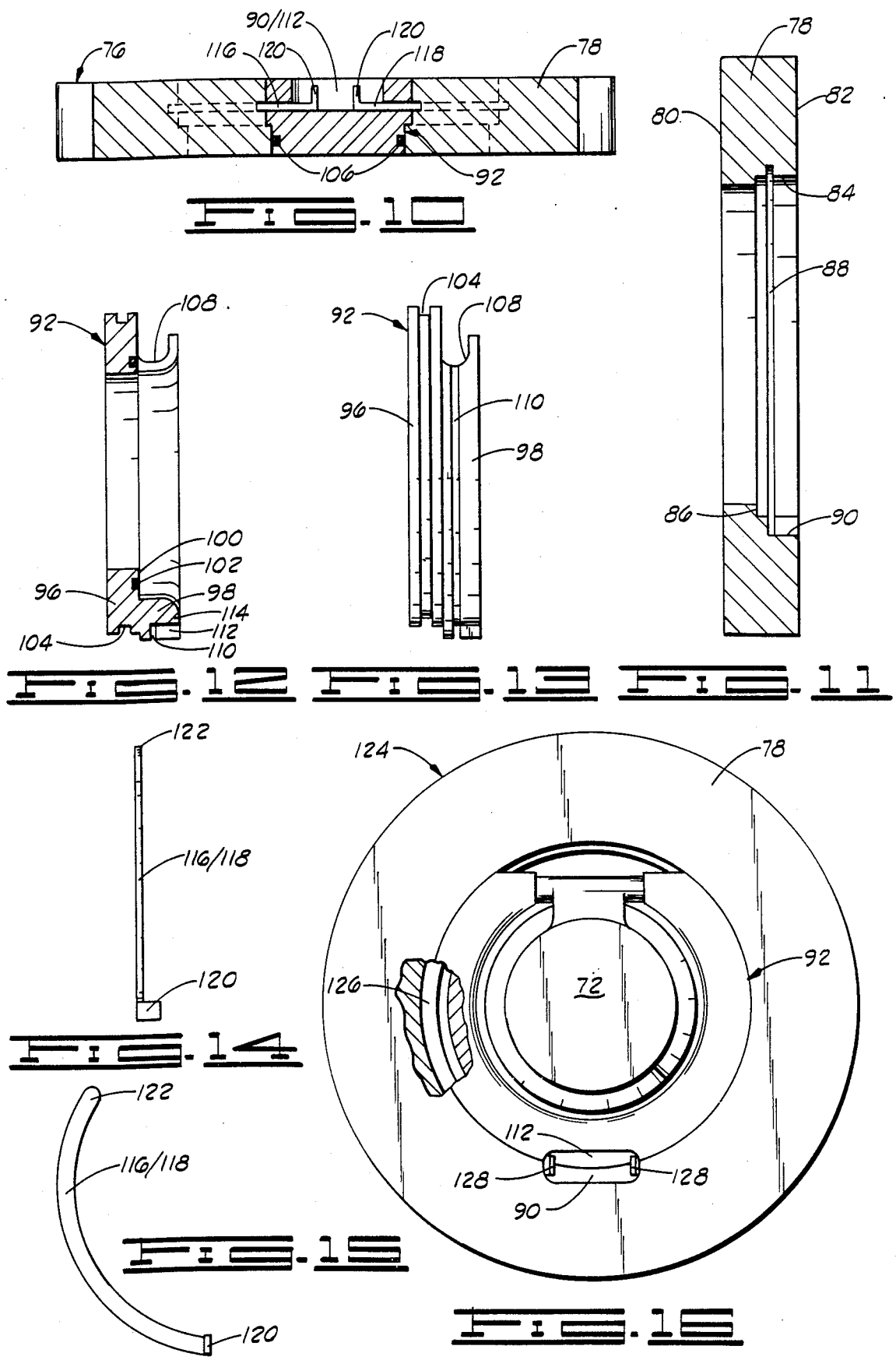

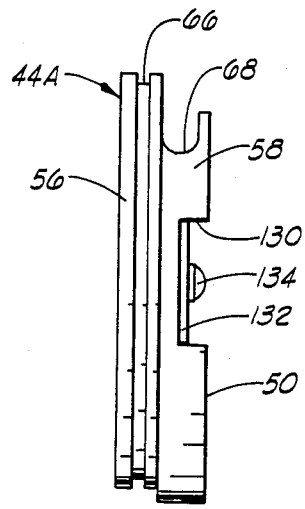
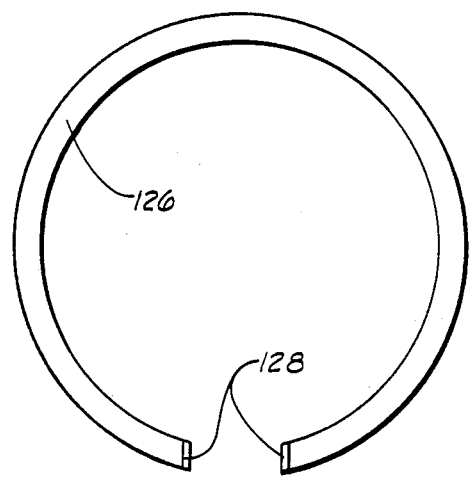
FIG. 21  FIG. 17
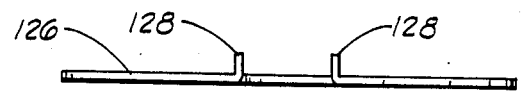
FIG. 18
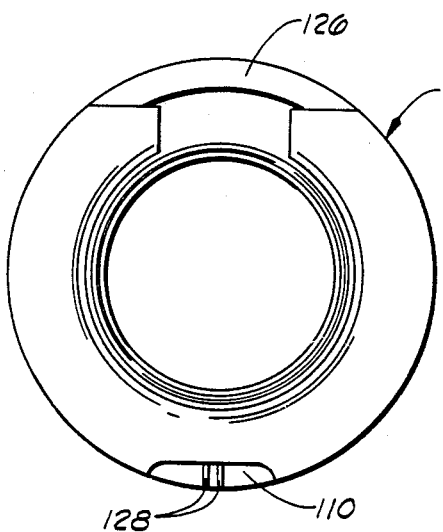
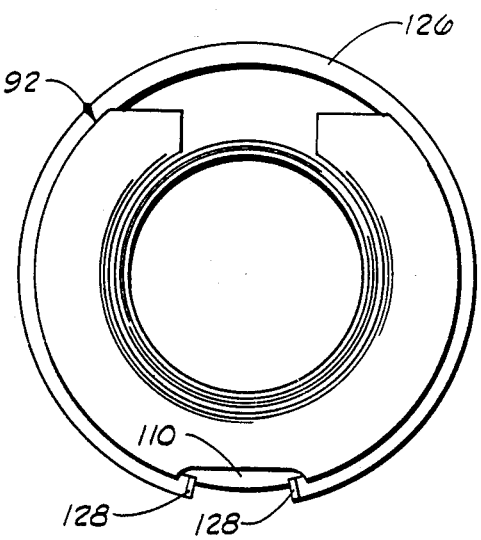
FIG. 19  FIG. 20

SWING CHECK VALVE WITH SECURED CARTRIDGE

CROSS REFERENCE TO RELATED APPLICATIONS

Related subject matter is disclosed in U.S patent application Ser. No. 168,506 filed Mar. 15, 1988 entitled Check Valve, now U.S. Pat. No. 4,809,739; U.S. patent application Ser. No. 168,507, filed Mar. 15, 1988, entitled Check Valve, now U.S. Pat. No. 4,809,741; U.S. patent application Ser. No. 049,383, filed May 13, 1987 entitled Swing Check Valve, now U.S. Pat. No. 4,809,738, and a U.S. patent application Ser. No. 286,979, entitled Swing Check Valve With Secured Cage filed on even date herewith.

BRIEF SUMMARY OF THE INVENTION

1. Field of the Invention

This invention relates to swing check valves, and more particularly, but not way of limitation, to swing check valves adapted for use between flanges.

2. Background of the Invention

Historically, in between-flange swing check valves, sometimes known as wafer type valves, the seat and cage for supporting the disc have been retained in position against movement either upstream or downstream, or both, by the flanges at the ends of the valve; or, more correctly, by gaskets interposed between the ends of the valve body and the mating pipe flanges. Such an arrangement can be satisfactory if there is a gasket utilized for transmitting forces from the seat or cage to the adjacent pipe flange. However, if such a gasket is not available, such as in valves utilizing a spiral round styled gasket, or a metal ring styled gasket, the flanges do not provide resistance against movement of the cage and seat either upstream or downstream.

The present invention provides various techniques for securing the cartridge, constituting both the valve seat and cage, along with the valve disc, in position in the valve body without the use of gaskets at the end of the valve body when the cartridge extends essentially throughout the entire length of the valve body.

BRIEF DESCRIPTION OF THE DRAWINGS

FIG. 1 is a vertical cross-sectional view through one form of valve constructed pursuant to this invention.

FIG. 2 is an end elevational view of the valve shown in FIG. 1 looking at the right-hand side of FIG. 1.

FIG. 3 is a vertical cross-sectional view of the valve body only of the valve of FIG. 1.

FIG. 4 is a vertical cross-sectional view through the combination seat and cage of the valve of FIG. 1.

FIG. 5 is an end view of the combined cage and seat looking at the right-hand side of FIG. 4.

FIG. 6 is an elevational view o a snap-ring used in the valve of FIG. 1.

FIG. 7 is a cross-sectional view taken along lines, 7—7 of FIG. 6.

FIG. 8 is a vertical cross-sectional view through another form of valve constructed pursuant to this invention.

FIG. 9 is an elevational view of the valve of FIG. 8 looking at the right-hand side of FIG. 8.

FIG. 10 is a cross-sectional view taken along lines 10—10 of FIG. 9.

FIG. 11 is a vertical cross-sectional view through the valve body of the valve of FIG. 8.

FIG. 12 is a vertical cross-sectional view of the combination seat and cage of the valve of FIG. 8.

FIG. 13 is a side view of the combined seat and cage of the valve of FIG. 8.

FIG. 14 is a side view of one of the plate-like members used for securing the cartridge in the valve body of the valve of FIG. 8.

FIG. 15 is a view of a plate-like member of FIG. 14 taken at right angles to the view shown in FIG. 14.

FIG. 16 is an end view of another valve constructed pursuant to this invention .

FIG. 17 is an end of the ring used for securing the cartridge in the valve body in the valve of FIG. 16.

FIG. 18 is a view of the ring of FIG. 17 taken at right angles to the illustration in FIG. 18.

FIG. 19 is an illustration of the combination seat and cage of the valve of FIG. 16 showing the position of the locking ring for insertion of the cartridge in the valve body.

FIG. 20 is a view similar to FIG. 19 with the locking ring expanded as it would be when the cartridge is positioned in the valve body.

FIG. 21 is a side view of another form of cartridge which can be used in the valve of FIG. 1.

DETAILED DESCRIPTION OF THE DRAWINGS

Figures 22, 23:
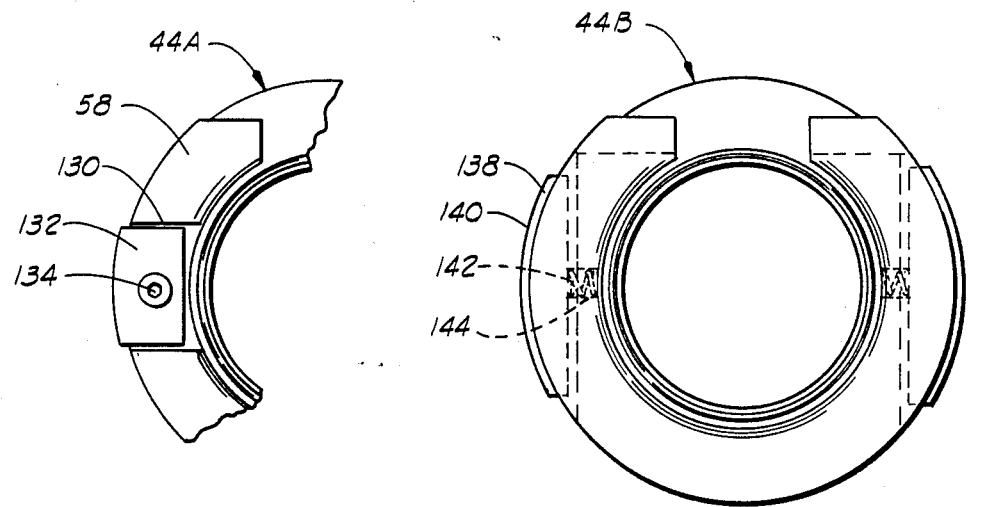
FIG. 22 is a partial end view of the combination seat and cage of FIG. 21.
FIG. 23 is an end view of a further modified combination seat and cage for use in a valve such the valve of FIG. 21.

Referring to the drawings in detail, and particularly FIGS. 1–7, reference 30 generally designates a valve constructed pursuant to this invention. The valve 30 comprises a valve body 32 having planar upstream and downstream ends 34 and 36, respectively. A bore 38 extends through the body 32 in communication with the ends 34 and 36. The bore 3 is in two diameters, to provide an annular shoulder 40 therein facing downstream. Also, a groove 42 extends around the inner periphery of the larger diameter portion of the bore 38 adjacent to downstream end 36.

A combination seat and cage member 44 is positioned in the bore 38 and has a total length between is upstream and downstream ends substantially corresponding with the length of the bore 38. In other words, the member 44 substantially fills the bore 38 and its opposite ends are substantially coterminous with the upstream and downstream ends 34 and 36 of the body 32. An annular shoulder 46 is formed on the outer periphery of the member 44 facing upstream to mate with the downstream shoulder 40 in the bore 38 to prevent the member 44 from moving upstream in the valve body 32.

As shown most clearly in FIG. 4, a recess 48 is provided on the major portion of the downstream end 50 of the member 44. When the member 44 is in operating position in the valve body 32, the recess 48 mates with the groove 42 in the valve body bore 38. A plate-like member in the form of a snap-ring 52, shown separately in FIGS. 6 and 7, fits in the groove 42 in the valve body bore 38 and extends into the recess 48 to engage the member 44 and prevent the member 44 from moving downstream in the valve body 32. The snap-ring 52 is provided with apertures 54 in the free ends thereof for the reception of the prongs of a suitable tool (not shown) for retracting or collapsing the snap-ring as the snap-ring is being installed in the groove 42.

The member 44 has a valve seat portion 56 and a cage portion 58. The seat portion 56 provides an annular valve seating face 60. A suitable sealing ring 62 is provided in a cooperating groove in the seating face 60. Another sealing ring 64 fits in a mating groove 66 in the outer periphery of the seat portion 56 to sealing engage the smaller diameter portion of the valve body bore 38 and prevent the leakage of fluid around the member 44.

The cage portion 58 extends around a major portion of the periphery of the member 44 and the free ends thereof are shaped into hinge pin bearings 68 to receive the opposite end portions of a hinge pin 70. The hinge pin 70 is integrally formed on a valve disc 72, such that the disc 72 is supported for swinging movement toward and away from the valve seat 60. One side 74 of the disc 72 provides a seating area sized to engage the seating face 60 of the member 44 in sealing engagement with the sealing ring 62 for preventing reverse flow through the valve 30 in the usual fashion.

The valve 30 is designed for use between standard pipe flanges and is particularly useful in those instances where the flanges do not provide support, either directly or indirectly through gaskets, to hold the cartridge comprising the member 44 and disc 72 in operating position in the valve body 32. Even though the cartridge completely fills the valve body 32 in the sense of having its upstream and downstream ends substantially coterminous with the upstream and downstream of the valve body 32, the cartridge is adequately held in the valve body against upstream and downstream movements. As previously indicated, the cooperating shoulders 40 and 46 prevent the cartridge from moving upstream in the event of a reversal of pressure across the valve, and the snap ring 52, cooperating with the groove 42 in the valve body bore and the recess 48 in the cartridge, prevents the cartridge from moving downstream.

Another valve constructed pursuant to this invention is illustrate in FIGS. 8-15 and is generally designated by reference character 76. The valve 76 has a valve body 78 with planar upstream and downstream ends 80 and 82, such that valve 76 is what is known as a wafer type valve for fitting between pipe flanges. A bore 84 extends through the valve body 78 in communication with the upstream and downstream ends 80 and 82, and is provided with a downstream facing shoulder 86 therein. Also, the body 78 is provided with an annular groove 88 extending around the larger diameter portion of the bore 84. A recess 90 is provided in the downstream end 82 of the valve body to provide access to the groove 88 from the downstream end of the valve.

A combination seat and cage member 92 is positioned in the valve body bore 84 and is of a length corresponding with the length of the valve body 78, such that the upstream and downstream ends of the member 92 are coterminous with the upstream and downstream ends 80 and 82 of the valve body 78. The member 92 has an annular shoulder 94 on the outer periphery thereof facing upstream to cooperate with the shoulder 86 in the valve body bore 84 to prevent the member 92 from moving upstream in the valve body 78 in the event of a pressure reversal across the valve.

The member 92 forms a seat portion 96 and a cage portion 98. As shown most clearly in FIG. 12, the seat portion 96 forms a downstream facing valve seat 100 having a sealing ring 102 therein. Also, the outer periphery of the seat portion 96 is provided with a circumferential groove 104 in the outer periphery thereof to receive a sealing ring 106 which sealingly engages the smaller diameter portion of the valve body bore 84 and prevents the leakage of fluid around the member 92.

The cage portion 98 of the member 92 extends around the major portion of the seating area 100 and the opposite ends thereof are formed into hinge pin bearings 108. The bearings 108 receive the opposite end portions of the hinge pin 70 of the disc 72, such that the disc 72 can swing toward and away from the seating area 100 to prevent the reversal fluid flow through the valve in the usual fashion.

An annular groove 110 extends around the outer periphery of the cage portion 98 of the member 92 in a position to be aligned with the valve body bore groove 88 when the member 92 is in operating position in the valve. The groove 110 provides a recess in the member 92 mating with the groove 88 in the valve body. Also, a recess 112 extends from the downstream end 114 of the cage portion 98 into communication with the groove 110. The recess 112 in the member 92 matches up with the recess 90 in the valve body 78 to provide a substantial opening from the downstream end of the valve into communication with the cooperating grooves 88 and 110.

A pair of plate-like members 116 and 118 fit in the mating grooves 88 and 110 to prevent the member 92 from moving downstream in the valve body 78. Each of the members 116 and 118 is shaped arcuately to extend around an arc of between 90 degrees and 180 degrees. And, as shown in FIGS. 9, 10, 14 and 15, each of these members is provided with a tab or protrusion 120 positioned to extend toward the downstream end of the valve into the opening provided by the cooperating recesses 90 and 112 when the members 116 and 118 are installed. Each of the members 116 and 118 is also somewhat flexible, such that each member can be installed after the member 92 is in position in the valve body 78 by first inserting the free end 122 of each member in through the opening provided by the recesses 90 and 112 into the cooperating grooves 88 and 11? ; whereupon the respective member 116 or 118 can be pushed on around the member 92 into the position shown in FIGS. 8, 9 and 10. Conversely, each of the members 116 and 118 can be readily removed by manually grasping the respective tab 120 and pulling the respective member from the file.

From the foregoing it will be apparent that the cartridge formed by the member 92 and the valve disc 72, although extending throughout the length of the valve body 78, does not rely upon flanges at either the upstream or downstream ends of the valve for limiting the upstream or downstream movement of the cartridge. Thus, the valve 76 is particularly suited for use between flanges where a ring-joint or spiral gasket is employed.

Another form of valve constructed pursuant to this invention is illustrated in FIGS. 16-20 and generally designated by reference character 124. The valve 124 utilizes the same valve body 78 and combination seat and cage member 92 and valve disc 72 used in the valve 76 previously described. The difference between the valve 124 and the valve 76 is that the valve 124 utilizes a single plate-like member 126. The member 126 is in the form of a lock-ring having tabs 128 on the free ends thereof. The member 126 and the groove 110 around the member 92 are sized such that the member 126 can be collapsed into the groove 110 as illustrated in FIG. 19 in order that the cartridge comprising the member 92 and the disc 72 can be inserted in and removed from the valve body 78. The member 126 is compressed or collapsed in this manner by manually grasping the tabs 128 and pulling them toward one another as illustrated in FIG. 19. When the cartridge comprising the member 92 and disc 72 is in position in the valve body 78, the tabs 128 are released and the member 126 expands to a position where it extends partially into the groove 110 of the member 92 and partially into the groove 88 of the valve body bore 84 as illustrated in FIG. 20. In this position, the member 126 anchors the member 92 against downstream movement in the valve body 78.

A modified combination seat and cage member 44A is illustrated in FIGS. 21 and 22 and is adapted for use in the valve body 32 of the valve 30 previously described. In this modification, the cage portion 58 of the member 44A is provided with a pair of recesses 130 in diametrically opposed relation in the downstream end 50 of the member 44A. Each recess 130 receives a plate-like member 132 which is secured to the member 44A by a screw 134. Each plate-like member 132 is sized to extend radially outwardly of the member 44A into the groove 42 of the valve body bore 38; thus anchoring the member 44A against downstream movement in the valve body 32. The plates 132 and recesses 130 are sized such that the plates 132 can be installed after the member 44A is positioned in operating position in the valve body 32.

Figures 24, 25:
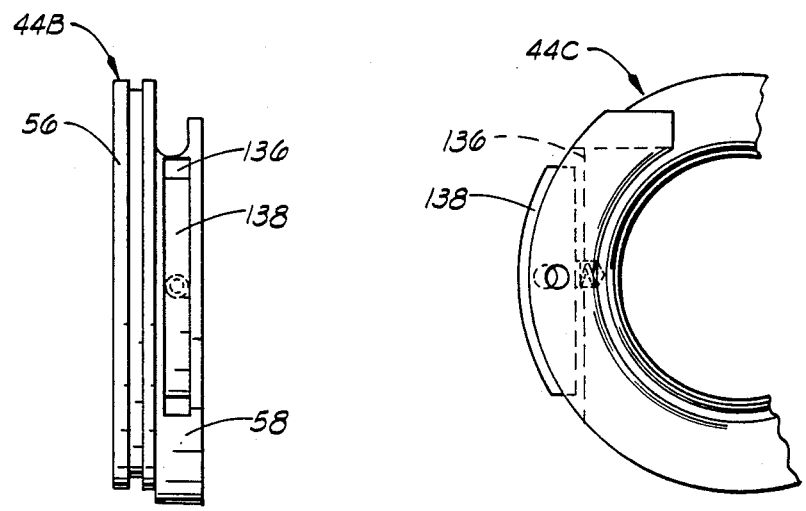
FIG. 24 is side view of the combined seat and cage shown in FIG. 23.
FIG. 25 is a partial end view of a further modified combined seat and cage similar to a seat and cage shown in FIG. 23.

Another modified seat and cage member 44B is illustrated in FIGS. 23 and 24 and is useful in the valve 30 previously described. The member 44B, instead of having an annular groove around the cage portion 58 is provided with diametrically opposed slots or recesses 136 therein which are aligned with the groove 42 of the valve body bore 38 when the member 44B is fully seated in the valve body 32. A plate-like member 138 is slidingly disposed in each of the recesses 136. The outer edge 140 of each plate-like member 138 is rounded and is sized to fit in the valve body bore groove 42 when urged outwardly in the respective recess 136 by a spring 142. Each spring 142 is anchored in a complementary bore 144 formed in the cage portion 58. Also, each plate-like member 138 is sized such that it can be pushed into the respective recess 136 against the action of the respective spring 142 in order that the member 44B can be installed in the valve body 32.

Figure 26:
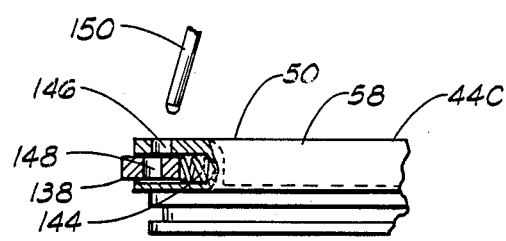
FIG. 26 is a top view of the structure shown in FIG. 29 with a portion of a structure broken away to illustrate details of construction.

Still another modified seat and cage member 44C is illustrated in FIGS. 25 and 26. The member 44C conforms to the member 44B in having the plate-like member 138 mounted in cooperating slots or recesses 136 in the opposite sides of the cage portion 58. In this embodiment, however, the cage portion 58 is provided with an aperture 146 extending from the end face 50 thereof into the recess 136 and each plate member 138 is provided with a complementary sized aperture 148 therein. With this construction, each member 138 can be retracted into the respective recess 136 by use of a pen-like tool 150 inserted through the apertures 146 and 148 such that the member 44C can be easily installed in the valve body 32. And when installed, the pen member 150 is removed; whereupon the springs 144 urge the plate-like members 138 outwardly into the groove 42 in the valve body bore 38 to anchor the member 44C in the valve body.

Changes may be made in the combination and arrangement of parts or elements as therefore set forth in specification and shown in the drawings without departing from the spirit and scope of the invention as defined in the following claims:

What is claimed is:

1. A swing check valve comprising:
   a body having planar upstream and downstream ends and a bore therethrough interconnecting the upstream and downstream ends, said bore having a larger diameter portion and a smaller diameter portion providing an annular shoulder in the bore facing downstream, and said bore having an annular groove therein downstream from said shoulder
   a valve seat in the bore having an annular shoulder thereon mating with the annular shoulder in the body;
   a disc sized to mate with the seat member;
   a ring shaped cage in the bore downstream from the seat supporting the disc for pivotal movement toward and away from the seat having a recess in the outer periphery thereof between the opposite ends thereof mating with said groove; and
   a plate-like member extending into said groove and said recess to prevent the seat and cage from moving downstream in the valve body.

2. A valve as defined in claim 1 wherein the seat and cage are formed as one member.

3. A valve as defined in claim 2 characterized further to include a sealing ring in the outer periphery of said one member sealing engaging the wall of the smaller diameter portion of the bore through the valve body.

4. A valve as defined in claim 1 wherein said plate-like member is in the form of a snap-ring.

5. A valve as defined in claim 2 wherein said plate-like member is in the form of a snap-ring.

6. A valve as defined in claim 5 wherein a portion of a downstream end of said one member is recessed over a length sufficient to receive the snap-ring therein.

7. A valve as defined in claim 2 wherein said one member has a groove in the outer periphery thereof aligned with the groove in the valve body when said one member is in operating position in the valve body; and
   said plate-like member extends into both of said grooves.

8. A valve as defined in claim 7 wherein the plate-like member is in the form of a segment of a ring.

9. A valve as defined in claim 7 wherein the plate-like member is in the form of a pair of ring segments.

10. A valve as defined in claim 9 wherein one end of each ring segment has a protrusion thereon extending generally at a right angle to the ring segment.

11. A valve as defined in claim 10 wherein the downstream end of said one member is recessed from the downstream face of said one member to the groove in said one member to receive said protrusions;
   whereby each ring segment may be installed through said recess into said grooves.

12. A valve as defined in claim 7 wherein a recess is formed in the downstream end of said one member intersecting the groove in said one member; and wherein the plate-like member comprises a snap-ring extending from one portion of said recess around said one member to another portion of said recess.

13. A valve as defined in claim 12 wherein the opposite end of said snap-ring have protrusions thereon positioned in said recess.

14. A valve as defined in claim 2 wherein said plate-like member comprises a pair of plates secured to diametrically opposite sides of said one member and extending into the groove in the valve body.

15. A valve as defined in claim 14 characterized further to include a threaded fastener securing each of said plates to said one member.

16. A valve as defined in claim 15 wherein the downstream end of said one member has a pair of recesses therein receiving said plates.

17. A valve as defined in claim 14 wherein said one member has a pair of diametrically opposed recesses in the outer periphery thereof receiving portions of said plates.

18. A valve as defined in claim 17 characterized further to include a spring in each of said recesses urging the respective plate into the adjacent portion of the groove in the valve body.

19. A valve as defined in claim 18 wherein apertures are formed in the downstream end of said one member communicating with said recesses; and wherein an aperture is formed in each of said plates in a position to be aligned with an aperture in an downstream end of said one member, whereby a pin-like tool maybe extended through said apertures for moving the respective plate.

* * * * *

UNITED STATES PATENT AND TRADEMARK OFFICE
CERTIFICATE OF CORRECTION

PATENT NO. : 4,852,603
DATED : August 1, 1989
INVENTOR(S) : John P. Scaramucci It is certified that error appears in the above-identified patent and that said Letters Patent is hereby corrected as shown below:

Col. 1, line 58, please delete the letter "o" and substitute therefor the word -- of --.

Col. 2, line 55, please delete the word "is" and substitute therefor the word -- its --.

Col. 4, line 50, please delete the letters "11?" and substitute therefor the numbers -- 110 --.

Signed and Sealed this

Twenty-ninth Day of May, 1990

*Attest:*

HARRY F. MANBECK, JR.

*Attesting Officer*      *Commissioner of Patents and Trademarks*